US012783157B2

(12) United States Patent
Tang et al.

(10) Patent No.: US 12,783,157 B2
(45) Date of Patent: Nov. 3, 2026

(54) SYSTEMS AND METHODS FOR MEMORY CONTROLLER WITH PROGRAMMABLE INTERFACE SIGNAL

(71) Applicant: Taiwan Semiconductor Manufacturing Company Ltd., Hsinchu (TW)

(72) Inventors: Chung-Wen Tang, Hsinchu (TW); Tan-Li Chou, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 241 days.

(21) Appl. No.: 18/643,208

(22) Filed: Apr. 23, 2024

(65) Prior Publication Data

US 2025/0328275 A1 Oct. 23, 2025

(51) Int. Cl.
*G06F 3/06* (2006.01)

(52) U.S. Cl.
CPC .......... *G06F 3/0655* (2013.01); *G06F 3/0604* (2013.01); *G06F 3/0671* (2013.01)

(58) Field of Classification Search
None
See application file for complete search history.

(56) References Cited

U.S. PATENT DOCUMENTS

2007/0192527 A1* 8/2007 Ogawa ................. G11C 7/1045 711/100
2013/0279232 A1* 10/2013 Sharette ................ H10W 40/25 365/51
2021/0011636 A1* 1/2021 Atsatt .............. H03K 19/17724
2021/0055935 A1* 2/2021 Basu ................... G06F 12/0238

* cited by examiner

*Primary Examiner* — Anh Q Tran
(74) *Attorney, Agent, or Firm* — Foley & Lardner LLP

(57) ABSTRACT

A circuit includes a memory controller operatively coupled between a host and a memory device, and configured to receive an instruction signal from the host and provide the memory device with a programmable interface signal based on the instruction signal. The memory controller includes a programmable memory array including a plurality of memory cells, and wherein each of the plurality of memory cells is configured to store data in a format that has a plurality of programmable fields.

20 Claims, 10 Drawing Sheets

220

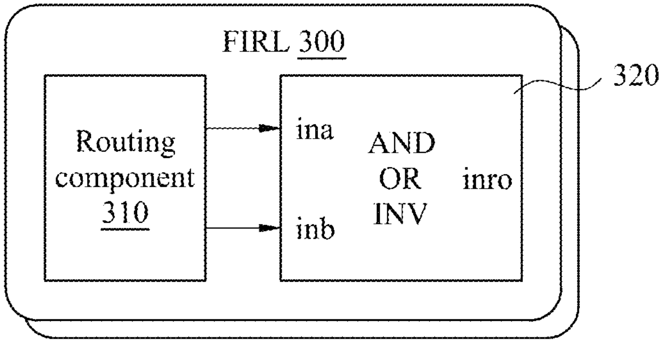
Fig. 3A
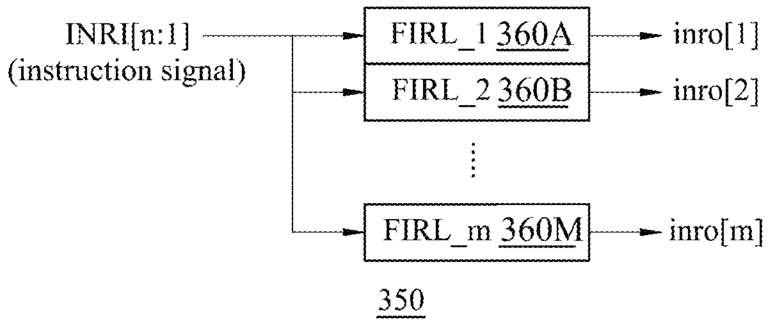
Fig. 3B
| REG | Description | |
|---|---|---|
| Reg_in_sela_x(x=1~INRO number(m)) | Select from INRI to INRO[x] input A | |
| Reg_in_selb_x(x=1~m) | Select from INRI to INRO[x] input B | |
| Reg_in_pora_x(x=1~m) | Determine ina[x] polarity | 1=inverse |
| Reg_in_porb_x(x=1~m) | Determine inb[x] polarity | 1=inverse |
| Reg_in_log_x(x=0~INRO number -1) | Determine INRO logic | 0=AND<br>1=OR |
Fig. 3C

| nxtpc | jtype | isel | outen | outv |
|---|---|---|---|---|
| [`MEM_AW-1:0] | [0] | [`ISEL_W-1:0] | [`OUT_W-1:0] | [`OUT_W-1:0] |

400

Fig. 4

SYSTEMS AND METHODS FOR MEMORY CONTROLLER WITH PROGRAMMABLE INTERFACE SIGNAL

BACKGROUND

Developments in electronic devices, such as computers, portable devices, smart phones, internet of thing (IoT) devices, etc., have prompted increased demands for memory devices. In general, memory devices may be volatile memory devices and non-volatile memory devices. Volatile memory devices can store data while power is provided, by but may lose the stored data once the power is shut off. Unlike volatile memory devices, non-volatile memory devices may retain data even after the power is shut off but may be slower than the volatile memory devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A is a schematic diagram of an example circuit that can be coupled with a memory system, in accordance with some embodiments.

FIG. 3B is a schematic diagram of an example circuit that can be coupled with a memory system, in accordance with some embodiments.

FIG. 3C is a table of example functions of the circuit shown in FIG. 4A, in accordance with some embodiments.

FIG. 4 is a table of an example instruction format stored in a memory controller, in accordance with some embodiments.

DETAILED DESCRIPTION

Figure 1:
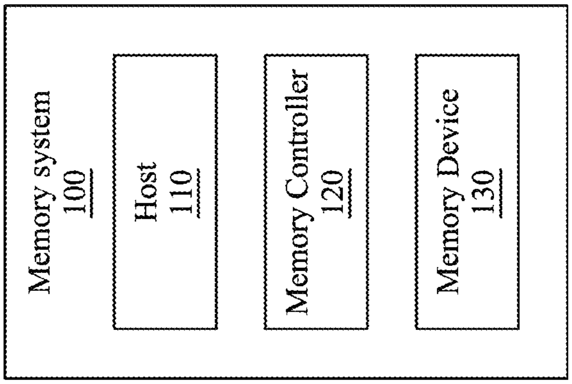
FIG. 1 is a block diagram of an example memory system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In computing systems, a host (e.g., a central processing unit (CPU), a graphics processing unit (GPU), or any main controller for managing various components and executing tasks within a system) can interact, through a memory controller, a memory device to perform the operation of memory devices (e.g., store and retrieve data). The memory controller can act as a state machine, governing the flow of data between the host and the memory device. The host and memory controller can operate to control the operation of memory devices, such as magneto-resistive random access memory (MRAM), resistive random access memory (RRAM), dynamic random-access memory (DRAM), solid-state drives (SSDs), etc. to store and access data for various computing tasks.

Traditionally, a computing system can use a hardwired state machine as a memory controller to control a memory device. However, when the host and the memory controller is not properly configured and/or coupled, an unexpected error and/or bug can occur. Moreover, since the traditional hardwired state machine is not flexible in changing behavior, the error and/or bug can severely impact the performance of the memory device and the system, causing significant costs.

The present application provides techniques for a memory controller that can provide a programmable interface signal to a memory device in a flexible manner. According to some embodiments of the present application, the memory controller can be operatively coupled between a host and a memory device. The memory controller can be configured to receive an instruction signal from the host and provide the memory device with a programmable interface signal based on the instruction signal. In some embodiments, the memory controller can include a programmable memory array including a plurality of memory cells, and each of the plurality of memory cells can be configured to store data in a format that has a plurality of programmable fields. The behavior and/or functions of the memory controller can change and/or be updatable in a flexible manner, allowing for reduced costs (e.g., to replace a hardwired state machine).

FIG. 1 is a block diagram of an example memory system 100, in accordance with some embodiments. The memory system 100 can include a host 110, a memory controller 120, and a memory device 130 The memory controller 120 can be operatively coupled between the host 110 and the memory device 130. The memory controller 120 can be configured to receive an instruction signal from the host 110 and provide the memory device 130 with a programmable interface signal based on the instruction signal. In some embodiments, the memory controller 120 can include a programmable memory array including a plurality of memory cells, and wherein each of the plurality of memory cells can be configured to store data in a format that has a plurality of programmable fields. In some embodiments, the memory system 100 is implemented as an integrated circuit.

The host 110 may be or include any controller configured to control various components (e.g., the memory controller 120, the memory device 130, etc.) within the memory system 100. For example, the host 110 may be a central processing unit (CPU), a graphics processing unit (GPU), etc. For example, the host 110 may be any device or system configured to control a state machine (e.g., the memory controller 120) and its associated memory device. In some embodiments, the host 110 can be configured to provide an instruction signal.

The memory device 130 is a hardware component to store data. In one aspect, the memory device 130 is embodied as a semiconductor memory device. The memory device 130 can include a plurality of storage circuits or memory cells. In some embodiments, the memory device 130 may be or include a plurality of memory cells arranged in two-or three-dimensional arrays. In some embodiments, the memory device 130 can be configured based on an interface signal from the memory controller 120. For example, the memory controller 120 can be configured to send a programmable interface signal to the memory device 130, which can be configured based on the received programmable interface signal. In some embodiments, the memory device 130 may be or include at least one of multi-time programmable memory (MTP), resistive random access memory (RRAM), magneto-resistive random access memory (MRAM), etc. In some embodiments, the memory device 130 may be include any type of non-volatile memory.

The memory controller 120 is a hardware component to control operations of the memory device 130. In some embodiments, the memory controller 120 can include a bit line controller, a gate line controller, and a timing controller to control bit lines, gate lines, and timing of the memory device 130, respectively. For example, the memory controller 120 may be or include a circuit to provide a voltage or a current through a corresponding line (e.g., corresponding to bit lines, gate lines, timing, etc.) of the memory device 130. In some embodiments, the memory controller 120 can be configured to receive the instruction signal from the host 110. In some embodiments, the memory controller 120 can be configured to generate a programmable interface signal based on the instruction signal. In some embodiments, the memory controller 120 can include a programmable memory array that can store a plurality of programmable fields. In some embodiments, the programmable memory array may be or include static random access memory (SRAM), read-only memory (ROM), or flip flops, etc.

As discussed herein, the memory system 100 can provide techniques that can control memory devices in a flexible manner. The behavior and/or functions of a memory controller (e.g., the memory controller 120) can change and/or be updatable in a flexible manner, allowing for reduced costs (e.g., to replace a hardwired state machine).

Figure 2B:
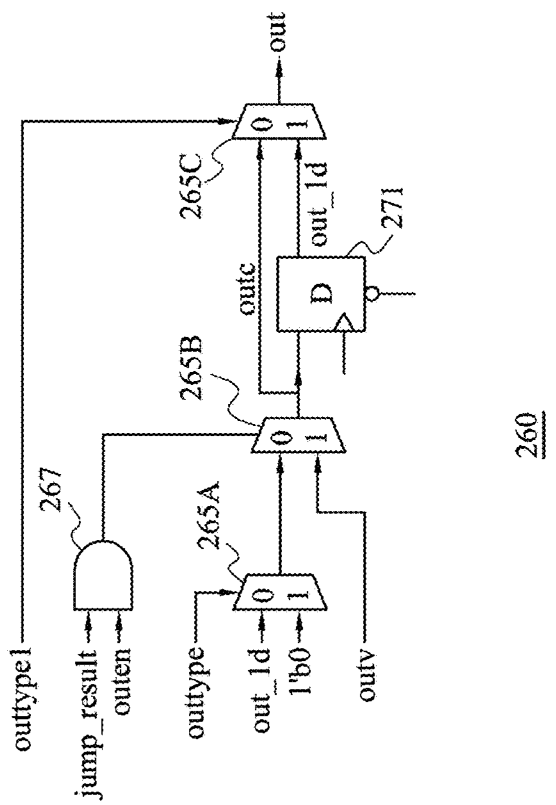
FIG. 2B is a schematic diagram of an example output component, in accordance with some embodiments.
Figure 2A:
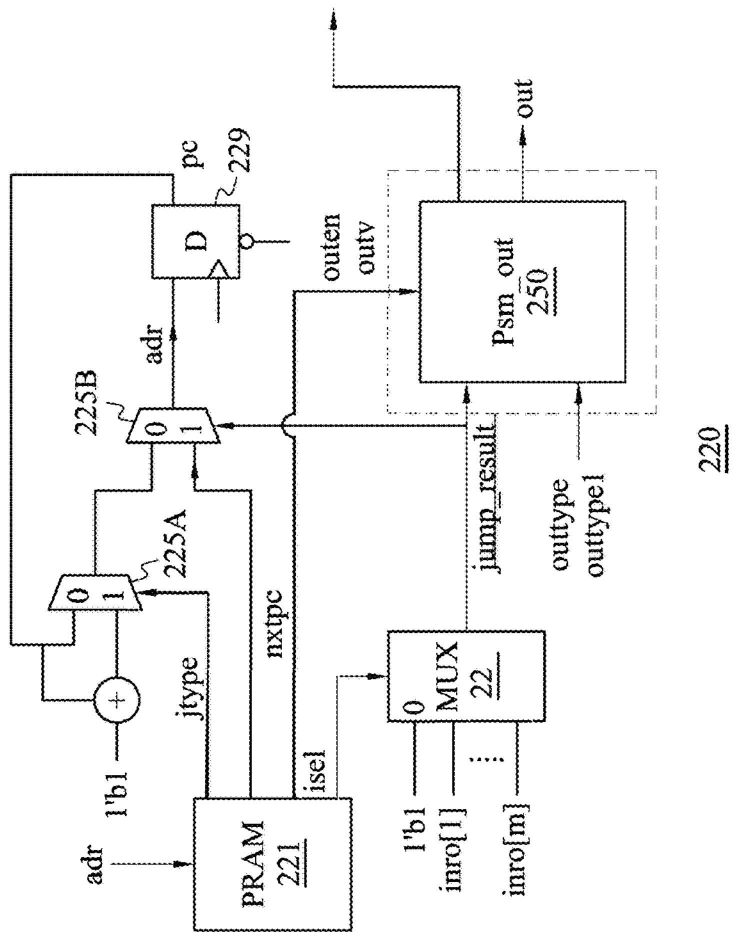
FIG. 2A is a schematic diagram of an example memory controller, in accordance with some embodiments.

FIG. 2A is a schematic diagram of an example memory controller 220, in accordance with some embodiments. The memory controller 220 is a non-limiting example of the memory controller 120. The memory controller 220 may be substantially similar to or incorporate features of the memory controller 120. The memory controller 220 can include a programmable memory array (PRAM) 221, a multiplexer 223, branch conditions 225 (225A, 225B), and an address circuit 229. The memory controller 220 can generate the programmable interface signal out based on various types of output components (which can include a logic gate, a branch condition, an output circuit, etc.). In some embodiments, as shown in FIG. 2A, the memory controller 220 can include an output component 250. FIG. 2B is a schematic diagram of an example output component 260, in accordance with some embodiments.

In some embodiments, the memory controller 220 can be operatively coupled between a host (e.g., the host 110) and a memory device (e.g., the memory device 130). In some embodiments, the memory controller 220 can be configured to receive an instruction signal from the host and provide the memory device with a programmable interface signal out based on the instruction signal. In some embodiments, the instruction signal can include a plurality of conditions. For example, the plurality of conditions may be or include, 1'b1, inro[1], . . . inro[m].

In some embodiments, the PRAM 221 can include a plurality of memory cells, each of which can be configured to store data in a format that has a plurality of programmable fields. In some embodiments, a first field of the plurality of programmable fields can include a value associated with one or more of the plurality of conditions 1'b1, inro[1], . . . inro[m] in the instruction signal. For example, the value can be used to select one or more of the plurality of conditions 1'b1, inro[1], . . . inro[m] in the instruction signal.

In some embodiments, the multiplexer 223 can be configured to receive the instruction signal, including the plurality of conditions 1'b1, inro[1], . . . inro[m]. The multiplexer 223 can be configured to select one of the plurality of conditions 1'b1, inro[1], . . . inro[m] based on one or more values in the plurality of programmable fields stored in the PRAM 221. For example, as shown in FIG, 2A the PRAM 221 can provide a value isel to the multiplexer 223, which can select one of the plurality of conditions 1'b1, inro[1], . . . inro[m] or a combination thereof based on the value isel.

In some embodiments, the memory controller 220 can generate and/or configure the instruction signal based on an address signal adr. In some embodiments, the address signal adr can include a value to generate and/or configure the instruction signal. For example, the address signal adr can be used to generate or indicate an address, and the programmable interface signal out associated with the address can be provided.

In some embodiments, the address circuit 229, and the branch conditions 225A and 225B can be used to generate the address signal adr, based on one or more values or signals (e.g., jtype, nxtpc, etc.) provided by the PRAM 221. In some embodiments, the branch conditions 225 may be or include a hardware component configured to provide an output depending on whether a condition is met. For example, the branch conditions 225 may be or include a multiplexer configured to provide an output based on a selection signal.

In some embodiments, the PRAM 221 can include programmable fields, including the values for jtype, nxtpc, etc. The branch conditions 225A and 225B can be configured to output a result, and the address circuit 229 can provide the address signal. In some embodiments, the address signal adr can be generated based on a result isel_result of selecting the one of the plurality of conditions 1'b1, inro[1], . . . inro[m].

In some embodiments, the address circuit 229 can be or include a D type flip-flop configured to sample and store data, and provide an output responsive to a clock signal.

In some embodiments, the memory controller 220 (e.g., the output component 250) can be configured to provide the programmable interface signal out based on a function of inputs included in the instruction signal. For example, the function can be generated based on a logic gate (e.g., the logic gate 267), a branch condition (e.g., the branch conditions 225), etc. In some embodiments, the programmable interface signal out can include or be configured to output various types of outputs to generate various waveforms (e.g., shown in FIG. 5). The configuration shown in the memory controller 220 is a non-limiting example, and any variation (e.g., a number, arrangement, etc. of the branch conditions 225) thereof can be configured to facilitate outputting the programmable interface signal out in a flexible manner. For example, the output component 250 can be configured in various manners.

Referring to FIG. 2B, as an example of the output component 250, the output component 260 can include branch conditions 265 (265A-265C), a logic gate 267, and an output circuit 271.

In some embodiments, the output circuit 271 can be or include a D type flip-flop configured to sample and store data, and provide an output responsive to a clock signal. In some embodiments, the output circuit 271 and the branch condition 265C can be operably coupled to provide an output out, such as programmable interface signal. For example, the branch condition 265A can receive a first input from the value or signal out_1d and a second input from a binary bit, for example, 1'b0. Based on the value or signal outtype, the branch condition 265A can provide one of the inputs to the branch condition 265B. The branch condition 265B can receive a first input from the branch condition 265A and a second input from the value or signal outv. Based on the value or signal (jump_result AND outen), the branch condition 265B can provide one of the inputs to the output circuit 271 or provide a value or signal oute to the branch condition 265C. The branch condition 265C can receive a first input from the branch condition 265B and a second input from the output circuit 271. Based on the value or signal outtype1, the branch condition 265C can provide the programmable interface signal out. In some embodiments, the memory controller 220 (e.g., the output component 260) can generate the output out based on one or more values indicated in or provided by outtype, outtypel, the PRAM 221 and/or the multiplexer 223. For example, the branch conditions 265A-265C and/or the logic gate 267 can be operably coupled to form various logic gates and/or logic conditions based on at least one of outtype1, Jump_result, outen, outtype, etc, which are discussed in greater detail below. The configuration shown in the memory controller 220 and the output component 260 are non-limiting examples, and any variation (e.g., a number, arrangement, etc. of the branch conditions 225, 265 and the logic gate 267) thereof can be configured to facilitate providing the output out (e.g., the programmable interface signal) in a flexible manner.

FIG. 3A is a schematic diagram of an example circuit 300 that can be coupled with a memory system (e.g., the memory system 100, the memory system 200, etc.), in accordance with some embodiments. In some embodiments, the circuit 300 can be sometimes referred to as a flexible input routing logic (FIRL) 300. In some embodiments, the circuit 300 can be coupled with or included in a memory controller (e.g., the memory controller 120, the memory controller 220, etc.) of the memory system.

As shown in FIG. 3A, the circuit 300 (the FIRL 300) can include a routing component 310 and a logic component 320. In some embodiments, the routing component 310 can receive an instruction signal INR[n:1] as shown in FIG. 3B. In some embodiments, the routing component 310 can provide the instruction signal INR[n:1] or one or more inputs included therein to the logic component 320. For example, as shown in FIG. 3A, the routing component 310 can provide a first input ina and a second input inb to the FIRL 300. The logic component 320 can include one or more logic gates (e.g., AND, OR, XOR, INV, etc.), a combination of which can generate a function of the inputs (e.g., the first input ina, the second input inb, etc.). The logic component 320 can provide a condition inro as an output of the function with respect to the inputs.

In some embodiments, the FIRL 300 can be configured to support a polarity change for each input from the routing component 310. In some embodiments, the FIRL 300 can be configured to support a logic gate for AND, OR, XOR, etc. to generate a function of inputs sent to a multiplexer (e.g., the multiplexer 223, etc.).

FIG. 3B is a schematic diagram of an example circuit 350 that can be coupled with a memory system (e.g., the memory system 100, the memory system 200, etc.), in accordance with some embodiments. In some embodiments, the circuit 350 can be coupled with or included in a memory controller (e.g., the memory controller 120, the memory controller 220, etc.) of the memory system.

In some embodiments, a multiplexer (e.g., the multiplexer 223) can include or be operably coupled with the circuit 350. For example, as shown in FIG. 3B, the multiplexer can be coupled with a plurality of FIRLs 360 (360A-360M). In some embodiments, the circuit 350 can be configured to receive an instruction signal INRI[n:1], which can include a plurality of inputs for the plurality of FIRLs 360, respectively. In some embodiments, the circuit 350 can be configured to provide a plurality of conditions inro[1]-inro[m] based on the instruction signal INRI[n:1], a routing component (e.g., the routing component 310) and a logic component (e.g., the logic component 320). This can contribute to configuring the memory system (e.g., a memory device thereof) to provide an interface signal in a flexible manner.

FIG. 3C is a table of example functions of the circuit 300, in accordance with some embodiments. In some embodiments, the circuit 300 (the FIRL 300) can operate based on configuration register values in a configuration register (REG). The FIRL 300 can perform and/or configure functions based on the configuration register values. For example, when the FIRL 300 receives "Reg_in_sela_x (x=1~INRO number(m))," the FIRL 300 can select the first input ina for the instruction signal INRO[1]-INRO[m]. When the FIRL 300 receives "Reg_in_selb_x(x=1~INRO number(m))," the FIRL 300 can select the first input inb for the instruction signal INRO[1]-INRO[m]. When the FIRL 300 receives "Reg_in_pora_x(x=1~m)," the FIRL 300 can determine a polarity of the first input(s) ina[x]. When the FIRL 300 receives "Reg_in_porb_x(x=1~m)," the FIRL 300 can determine a polarity of the second input(s) inb[x]. When the FIRL 300 receives "Reg_in_log_x(x=0~INRO number −1)," the FIRL 300 can determine a logic (e.g., "0" for an AND logic, "1" for an OR logic, etc.) to be applied to the condition inro. For example, when Reg_in_sela_0 is set to 1, Reg_in_selb_0 is set to 2, Reg_in_pora_0 is set to 0, Reg_in_porb_0 is set to 1, and Reg_in_log_0 is set to 0, then inro[0] can be set with INRI[1] and inverse of INRI[2].

FIG. 4 is a table of an example instruction format 400 stored in a memory controller (e.g., the memory controller 120, etc.), in accordance with some embodiments. In some embodiments, the memory controller can include a programmable memory array including a plurality of memory cells, and wherein each of the plurality of memory cells can be configured to store data in the instruction format 400. The instruction format 400 can include a plurality of programmable fields. The instruction format 400 is a non-limiting example, and can include more, fewer, or different fields.

In some embodiments, the instruction format 400 can include a next address field nxtpc whose width is to determine a maximum program depth. For example, ['MEM_AW-1:0] can be set to the next address field nxtpc, and the width thereof can be configured to determine a maximum program depth. In some embodiments, the next address field nxtpc can indicate whether to provide a programmable interface signal associated with a new address (e.g., the address signal adr as discussed with respect to FIG. 2).

In some embodiments, the instruction format 400 can include a jump type field jtype. For example, the jump type field jtype may be 1 bit field. When the jump type field jtype is set to "0," the address can keep unchanged until a branch condition (e.g., the branch conditions 225A, 225B, etc.) is met. When the jump type field jtype is set to "1," a new address can be specified if a branch condition is met, or a current address plus one can be assigned if a branch condition is not met.

In some embodiments, the instruction format 400 can include an input selection field isel. The input selection field isel can be determined by a value of at least a selected input, e.g., ['ISEL_W-1:0]. In some embodiments, a width of the input selection field isel can be to determine a maximum number of inputs. For example, a width of 4 bit can allow for 16 inputs selected.

In some embodiments, the instruction format 400 can include an output enable field outen. For example, the output enable field outen can be set with ['OUT_W-1:0]. In some embodiments, a width of the output enable field outen can be to determine a maximum number of outputs. For example, a width of 16 bit can allow for 16 outputs to be set simultaneously. When a bit is set to "1," a corresponding output can be set to a value specified by the corresponding output value bit.

In some embodiments, the instruction format 400 can include an output value field outv. In some embodiments, a width of the output value field outv can be the same as the output enable field outen. For example, the output value field outv can be set with ['OUT_W-1:0]. In some embodiments, a width of the output value field outv can be to determine a corresponding output value if a corresponding enable bit is set to "1."

In some embodiments, assembly language can be used for the instruction format 400. For example, "WAIT" can be used to indicate "wait jump" and/or set the jump type field jtype to "0." "IF" can be used to indicate "if jump, the jump type filed j is set to "1." When a multiple-level logic is used, "IF," "ELSEIF," etc. can be used. "UJMP" can be used to indicate an unconditional jump and/or set a value ISEL to "0." In some embodiments, a length of the instruction format 400 can be variable.

In some embodiments, the instruction format 400 can include multiple fields (e.g., multiple input selection fields, multiple output enable/value fields, multiple next address fields, etc.) to support a memory system with more branch conditions. In some embodiments, multiple values within a same filed can be selected at the same time. For example, there more than one instant response branches, and thus a corresponding number of input selection fields, output fields and next address fields can be included. For example, when a first priority jump condition is met, output and next address values can be determined by the output and next address fields corresponding to the first priority jump condition. If a second priority jump condition is met, output and next address values can be determined by the output and next address fields corresponding to the second priority jump condition.

Figure 5:
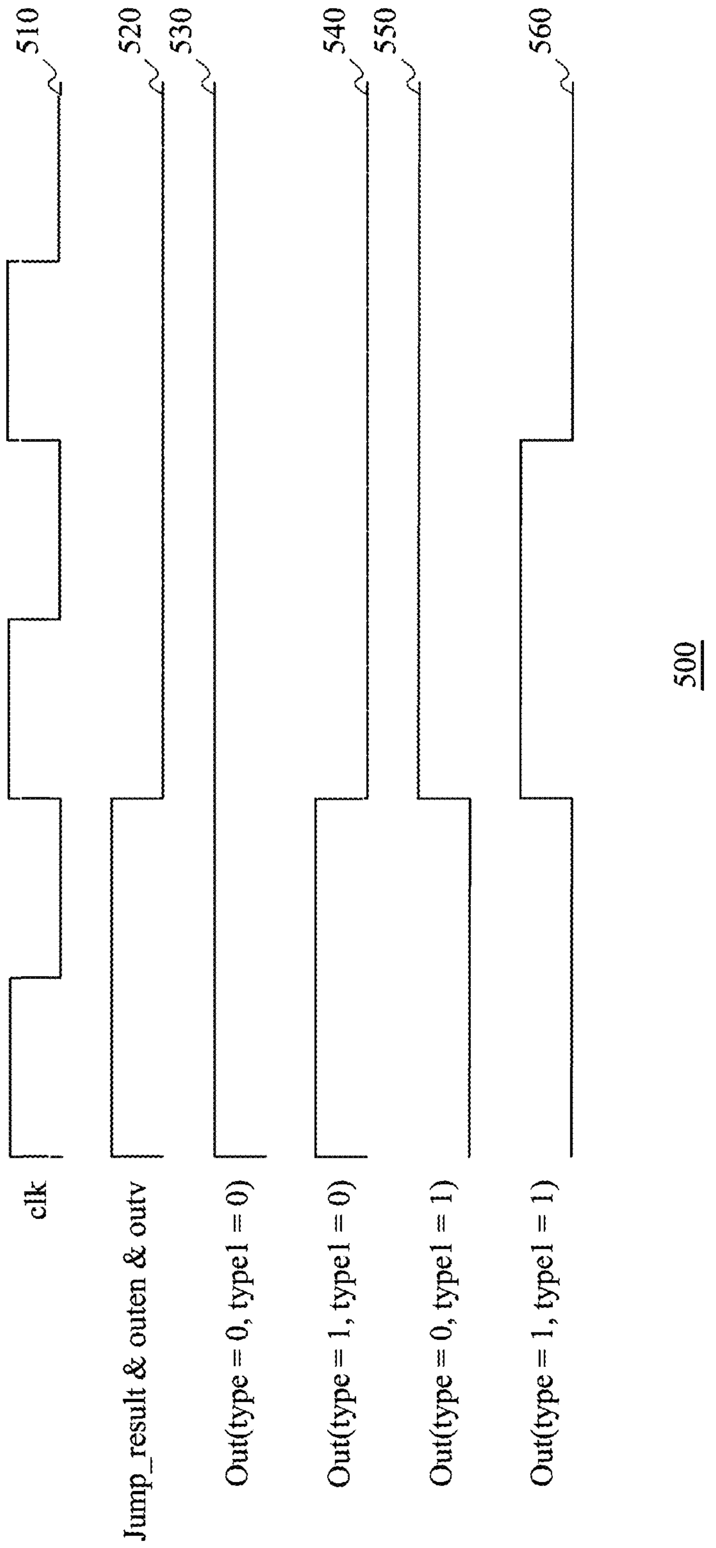
FIG. 5 is a plot of example programmable interface signals that can be provided by a memory controller, in accordance with some embodiments.

FIG. 5 is a plot 500 of example programmable interface signals 530-560 that can be provided by a memory controller (e.g., the memory controller 120), in accordance with some embodiments. The programmable interface signals 530-560 are non-limiting examples.

In some embodiments, the memory controller can support four types of outputs: a first type (Out(type=0, type1=0)), a second type (Out(type=1, type1=0)), a third type (Out (type=0, type1=1)) and a fourth type (Out(type=1, type1=1)). For the first type, the memory controller can provide a programmable interface signal 530 to support a level change with no cycle delay. For the second type, the memory controller can provide an interface signal 540 to support an edge change with no cycle delay. For the third type, the memory controller can provide an interface signal 550 to support a level change with a cycle delay. For the fourth type, the memory controller can provide an interface signal 560 to support an edge change with a cycle delay.

In some embodiments, as shown, the programmable interface signals 530-560 can be output based on a clock signal clk 510 and/or a signal 520 (e.g., Jump_result, outen, outv, etc. shown in FIG. 2A and FIG. 2B).

Figure 6A:
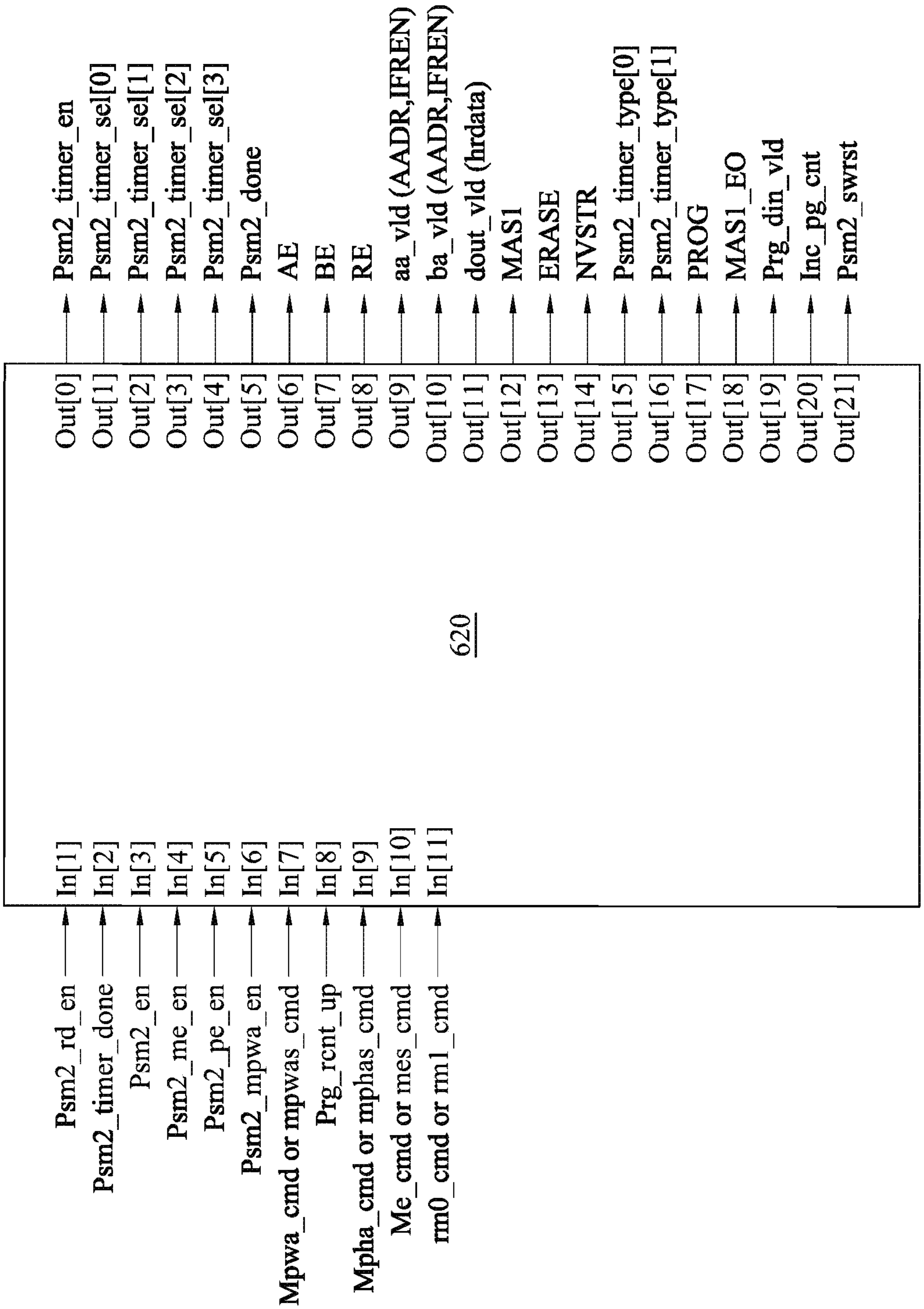
FIG. 6A is a block diagram of an example memory controller, in accordance with some embodiments.

FIG. 6A is a block diagram of an example memory controller 620, in accordance with some embodiments. The memory controller 620 is a non-limiting example of the memory controller 120. The memory controller 620 may be substantially similar to or incorporate features of the memory controller 120, the memory controller 120, etc. In some embodiments, as shown in FIG. 6A, the memory controller 620 can be used to generate programmable interface signals Out[0:21], based at least on conditions In[1:11]. For example, the memory controller 620 can include a multiplexer (e.g., the multiplexer 223), branch conditions (e.g., the branch conditions 225), an output component (e.g., the output component 250), etc. to generate the programmable interface signals Out[0:21].

In some embodiments, the conditions In[1:11] can include, but not limited to, Psm2_rd_en, Psm2_timer_done, Psm2_en, Psm2_me_en, Psm2_pe_en, Psm2_mpwa_en, Mpwa_cmd or mpwas_cmd, Prg_rent,_up, Mpha_cmd or mphas_cmd, Me-cmdormed_cmd, rm0_cmd or rml_cmd. Psm2_rd_en is a signal or a value that indicates "read operation is enabled." Psm2_timer_done is a signal or a value that indicates "timer is expired." Psm2_en is a signal or a value that indicates "PSM is enabled." Psm2_me_en is a signal or a value that indicates "mass erase operation is enabled." Psm2_pe_en is a signal or a value that indicates "page erase operation is enabled." Psm2_mpwa_en is a signal or a value that indicates "mass program whole array operation is enabled." Mpwa_cmd or mpwas_cmd is a signal or a value that indicates "mass program whole array command or mass program whole array smart command." Prg_rcnt_up is a signal or a value that indicates "program read count is up to the required value." Mpha_cmd or mphas_cmd is a signal or a value that indicates "mass program half array command or mass program half array smart command." Me_cmd or mes_cmd is a signal or a value that indicates "mass erase command or mass erase smart command." rm0_cmd or rm1_cmd is a signal or a value that indicates "read margin 0 command or read margin 1 command."

In some embodiments, based on the conditions In[1:11], the memory controller 620 can generate the programmable interface signals Out [0:21] associated with Psm2_timer_en, Psm2_timer_sel[0:3], Psm2_done, AE, BE, RE, aa_vld (AADR, IFREN), ba_vld (BADR), dout_vld (hrdata), MAS1, ERASE, NVSTR, Psm2_timer_type[0], Psm2_timer_type[1], PROG, MAS1_EO, Prg_din_vld, Inc_pg_cnt, Psm2_swrst. Psm2_timer_en is a signal or a value to control "timer enable." Psm2_timer_sel[0:3] is a signal or a value to control "timer expire value selection." Psm2_done is a signal or a value to control "the done status of PSM2." AE is a signal or a value to control "AADR enable in memory device side." BE is a signal or a value to control "BADR enable in memory device side." RE is a signal or a value to control "read enable in memory device side." aa_vld (AADR,IFREN) is a signal or a value to control "the outputs of AADR and IFREN." ba_vld (BADR) is a signal or a value to control "the outputs of BADR." dout_vld (hrdata) is a signal or a value to control "the capture of DOUT and then output to hrdata." MAS1 is a signal or a value to control "memory device mass erase function." ERASE is a signal or a value to control "memory device erase function." NVSTR is a signal or a value to control "memory device program function combined with PROG." Psm2_timer_type[0] is a signal or a value to control "timer type combined with timer_type[1]." Psm2_timer_type[1] is a signal or a value to control "timer type combined with timer_type[0]." PROG is a signal or a value to control "memory device program function combined with NVSTR." MAS1_EO is a signal or a value to control "memory device mass erase function." Prg_din_vld is a signal or a value to control "data latch of program data input." Inc_pg_cnt is a signal or a value to control "the increase of program counter." Psm2_swrst is a signal or a value to control "PSM's software reset." In some embodiments, based on the programmable interface signals Out[0:21], the memory controller 620 can generate a control signal or control a memory device.

Figure 6B:
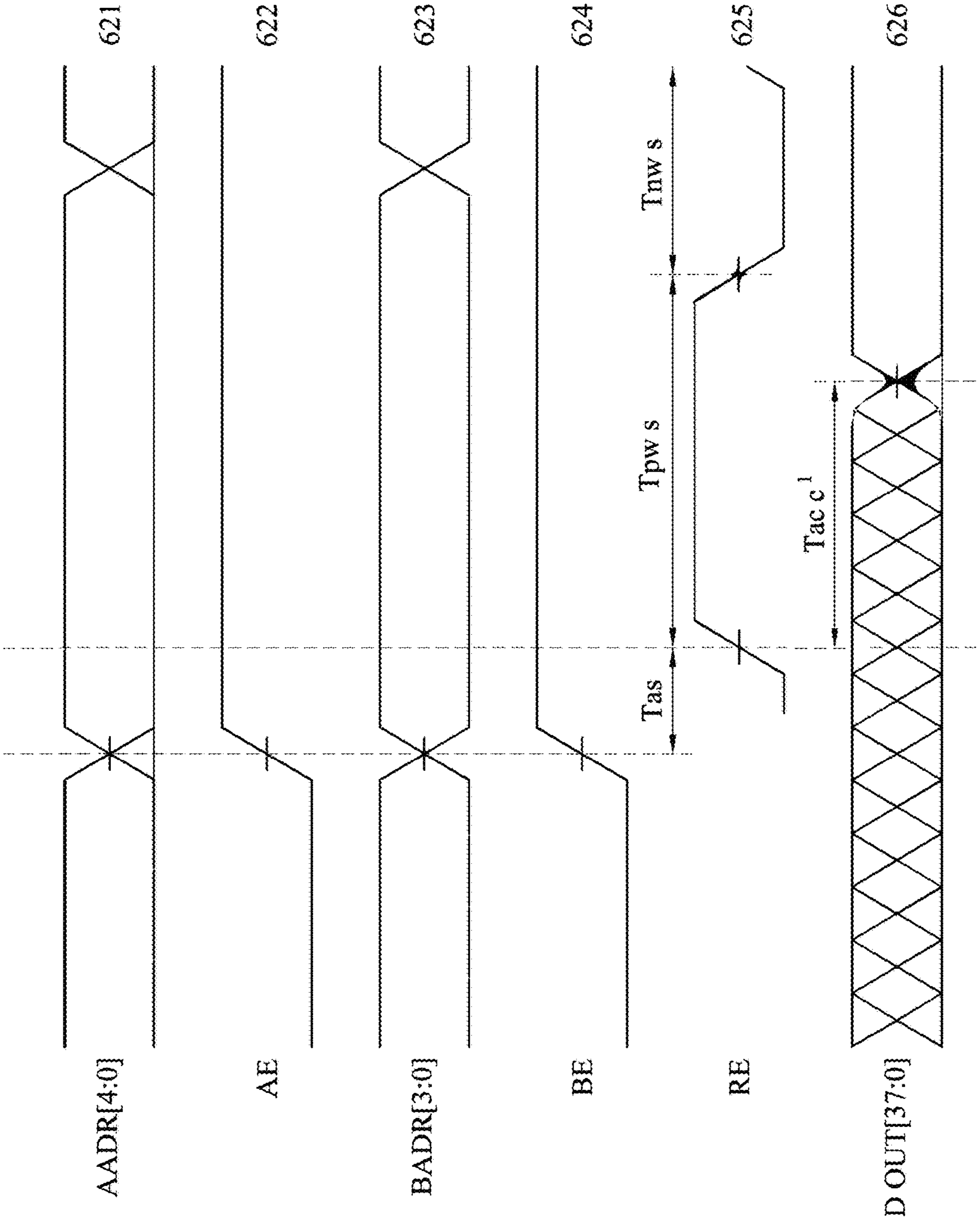
FIG. 6B is a plot of example programmable interface signals that can be provided by a memory controller, in accordance with some embodiments.

FIG. 6B is a plot 630 of example programmable interface signals that can be provided by the memory controller 620, in accordance with some embodiments. The memory controller 620 can generate the programmable interface signals, AE 622, BE 624, and RE 625, based on address values or signals AADR[4:0] 621 and BADR[3:0] 623. In some embodiments, a pulse width (e.g., Tas, Tpws, Tnws, Tacc[1], etc.) of the signal RE 625 can be configured based on the conditions In[1:11]. In some embodiments, based on at least one of the AE 622, BE 624, RE 625, AADR[4:0] 621, or BADR[3:0] 623, a signal DOUT[37:0] 626 can be generated by a memory device (e.g., the memory device 130).

Figure 6C:
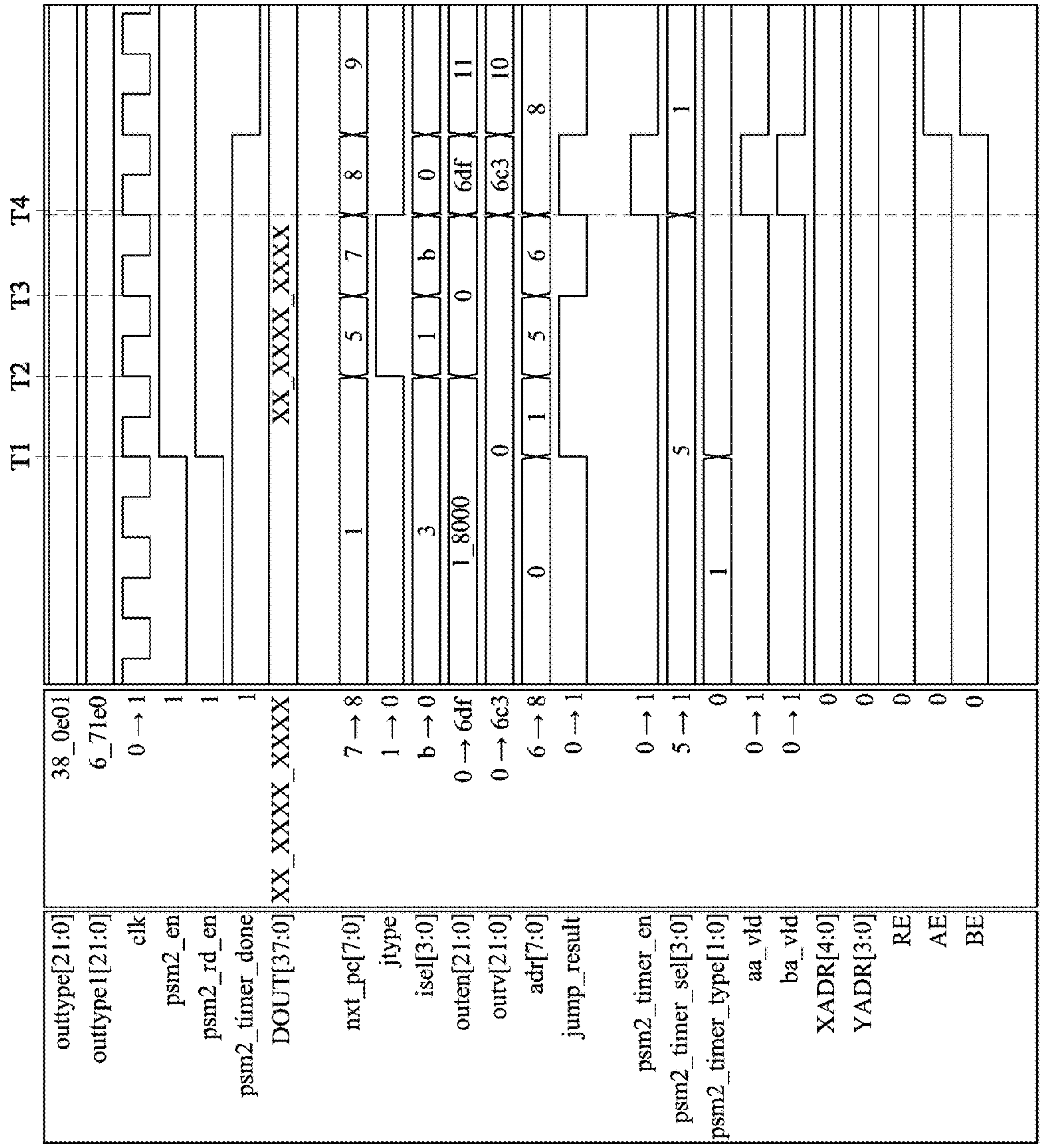
FIG. 6C is a plot of example signals or values associated with a memory controller, in accordance with some embodiments.

FIG. 6C is a plot 640 of example signals or values associated with the memory controller 620 during a first time period (e.g., T1 to T4), in accordance with some embodiments. In some embodiments, the signals or values shown in the plot 640 may be associated with the memory controller 620, the memory controller 120, the memory controller 220, and/or components (e.g., the PRAM 221, the multiplexer 223, the branch conditions 225, the address circuit 229, etc. shown in FIG. 2A) therein.

In some embodiments, as shown in FIG. 6C, at T1, isel can be set to "3" to select psm2_en which is asserted to "1." In this case, jump_result can be asserted and adr can be changed to "1" of nxt_pc. At T2, isel can be set to "1" to select psm2_rd_en which is asserted to "1." In this case, jump_result can be set to "1" and adr can be changed to "5" of nxt_pc. At T3, isel can be set to "11" to select rm0_cmd or rm1_cmd which is set to "0." In this case, jump_result can be set to "0." Since jtype is "1" (e.g., IF type), adr can be increased by "1" and changed from "5" to "6." At T4, isel can be set to "0" to select a binary bit, 1'b1. In this case, jump_result can be set to "1," and adr can be changed to "8" of nxt_pc. Since outen[0] is "1" and outv[0] is "1," out[0] psme_timer_en can be asserted. Because outtype[0] is "1" and outtype1[0] is "0," psm2_timer_en can be set to edge with zero delay type output. Since outen[7:6] and outv[7:6] are set to 2'b11, AE and BE can be asserted. Their outtype is "0" and outtype1 is "1," so one cycle delay type outputs can be provided. Since outen[10:9] and outv[10:9] are 2'b11, aa_vld and ba_vld can be asserted. Their outtype is "1" and outtypel is "0," so the signal can be set to edge, without cycle delay type outputs.

Figure 6D:
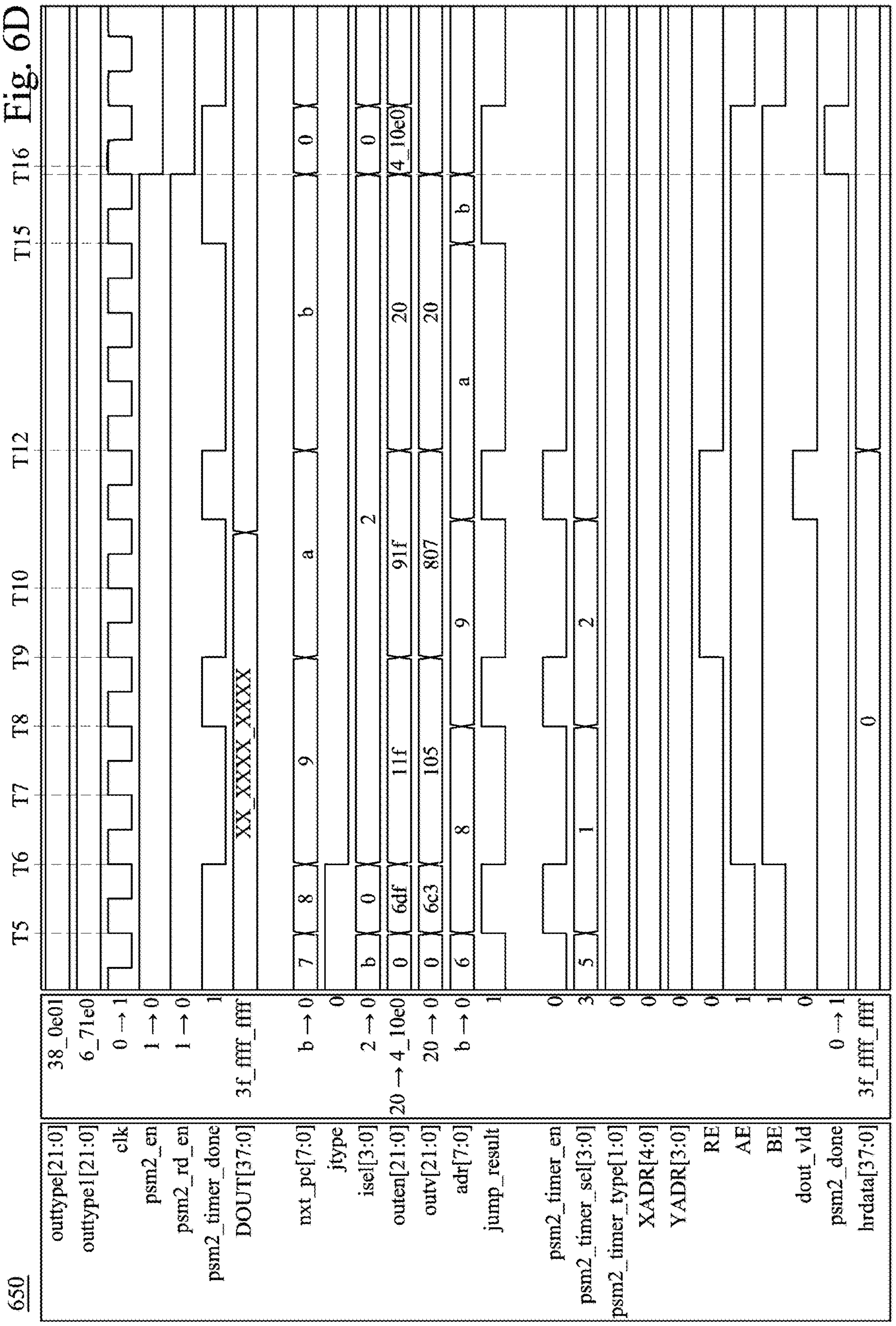
FIG. 6D is a plot of example signals or values associated with a memory controller, in accordance with some embodiments.

FIG. 6D is a plot 650 of example signals or values associated with the memory controller 620 during a second time period (e.g., T5 to T16), in accordance with some embodiments. In some embodiments, the plot 650 may be a plot continued from the plot 640. For example, the second time period may be after the first time period shown in FIG. 6C. In some embodiments, at T8, isel can be set to "2" to select psm2_timer_done which is asserted to "1." In this case, jump_result can be asserted and adr can be changed to "9" of nxt_pc. Since outen[8] and outv[8] are "1," RE can be asserted. outtype[8] can be set to "0" and outtype1[8] can be set to "1," In this case, RE can be level with one cycle delay type output. At T11, isel can be set to "2" to select psm2_timer_done, which is asserted to "1." In this case, jump_result can be asserted and adr can be changed to "10" of nxt_pc. Since outen[8] is "1" and outv[8] is "0," RE can de-asserted with one cycle delay. Because outen[11] and outv[1] are "1," dout_vld can be asserted. outtype[11] can be set to "1" and outtype can be set to "0," so dout_vld can be at edge with zero cycle delay output type. Here, Dout_vld can be used to latch data from DOUT to hrdata. At T15, isel can be set to "2" to select psm2_timer_done to be asserted. In this case, jump_result can be asserted and adr can be set to "11" of nxt_pc. Since outen[5] and outv[5] are "1," psm2_done can be asserted. outtype[5] is "0" and outtype1 [5] is "1," psm2_done can be level with one cycle delay output type. At T16, isel can be set to "0" to select a binary bit, 1'b1. In this case, jump_result can be active and adr can be set to "0" of nxt_pc. Since outen[7:5] are 3'b111 and outv[7:5] are 3'b000, AE, BE and psm2_done can be de-asserted with one cycle delay. Shown in FIGS. 6B, 6C, and 6D are merely non-limiting examples, and the memory controller disclosed herein can provide programmable interface signal in various manners for various purposes.

Figure 7:
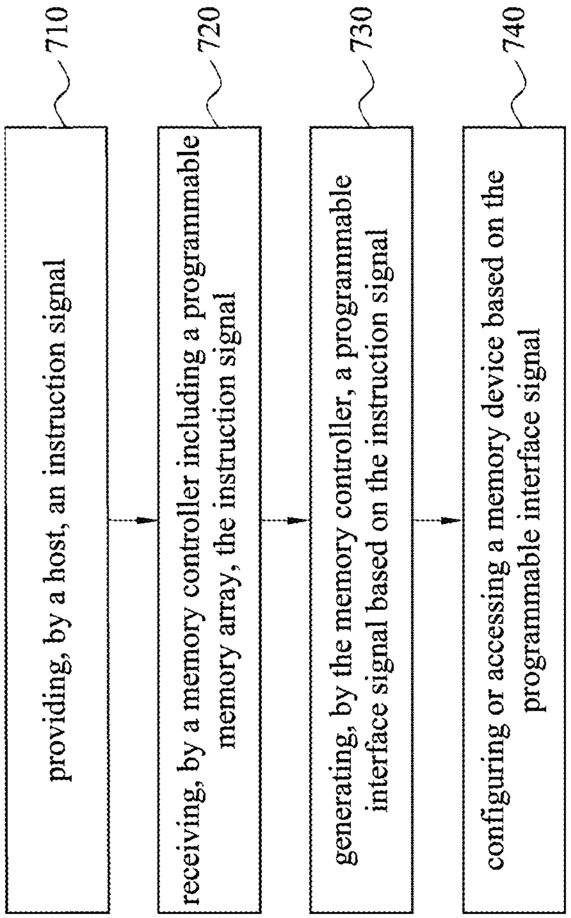
FIG. 7 is a flowchart of an example method for a memory system with a programmable interface signal, in accordance with some embodiments.

FIG. 7 is a flowchart of an example method 700 for a memory system (e.g., the memory system 100) with a programmable interface signal, in accordance with some embodiments. The method 700 may be performed by one or more components of the memory system 100, the memory system 200, etc. In some embodiments, the method 700 is performed by other entities. In some embodiments, the method 700 includes more, fewer, or different operations than shown in FIG. 7.

In a brief overview, the method 700 can start with operation 710 of providing, by a host, an instruction signal.

The method 700 can continue to operation 720 of receiving, by a memory controller including a programmable memory array, the instruction signal. The method 700 can continue to operation 730 of generating, by the memory controller, a programmable interface signal based on the instruction signal. The method 700 can continue to operation 740 of configuring or accessing a memory device based on the programmable interface signal.

At operation 710, a host (e.g., the host 110) can provide an instruction signal. In some embodiments, the instruction signal can include a plurality of conditions (e.g., the conditions inro[1], . . . inro[m] shown in FIG. 2, etc.).

At operation 720, a memory controller (e.g., the memory controller 120) can receive the instruction signal. In some embodiments, the memory controller can include a multiplexer (e.g., the multiplexer 223, etc.), which can receive the instruction signal. In some embodiments, the multiplexer can select one of a plurality of conditions in the instruction signal. In some embodiments, the multiplexer can select one of the plurality of conditions in the instruction signal based on a value of a programmable field within data stored in the memory controller (e.g., a memory array thereof, such as the PRAM 221, etc.).

At operation 730, the memory controller can generate a programmable interface signal (e.g., the programmable interface signal out[n-1:0], etc.) based on the instruction signal. In some embodiments, the programmable interface signal can include at least one of: a level change with no cycle delay, an edge change with no cycle delay, a level change with a cycle delay, or an edge change with a cycle delay.

At operation 740, the system can configure or access a memory device (e.g., the memory device 130) based on the programmable interface signal. In some embodiments, the system can configure, at a first time, the memory device based on the programmable interface signal indicating a first state of the memory controller and/or the associated memory device, and can configure, at a second time, the memory device based on the programmable interface signal indicating a second state of the memory controller and/or the associated memory device.

One aspect of this description relates to a circuit. The circuit includes a memory controller operatively coupled between a host and a memory device, and configured to receive an instruction signal from the host and provide the memory device with a programmable interface signal based on the instruction signal. The memory controller includes a programmable memory array including a plurality of memory cells, and wherein each of the plurality of memory cells is configured to store data in a format that has a plurality of programmable fields.

One aspect of this description relates a system. The system includes a host configured to provide an instruction signal, a memory controller, including a programmable memory array, the memory controller configured to receive the instruction signal and generate a programmable interface signal based on the instruction signal, a memory device configured to be configured based on the programmable interface signal, wherein the programmable memory array stores a plurality of programmable fields.

One aspect of this description relates to a method. The method includes providing, by a host, an instruction signal, receiving, by a memory controller including a programmable memory array, the instruction signal, generating, by the memory controller, a programmable interface signal based on the instruction signal, configuring a memory device based on the programmable interface signal, wherein the programmable memory array stores a plurality of programmable fields.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A circuit, comprising:

a memory controller operatively coupled between a host and a memory device, and configured to receive an instruction signal from the host and provide the memory device with a programmable interface signal based on the instruction signal;

wherein the memory controller comprises a programmable memory array comprising a plurality of memory cells, and wherein each of the plurality of memory cells is configured to store data in a format that has a plurality of programmable fields, and wherein the memory controller comprises a multiplexer configured to receive the instruction signal that includes a plurality of conditions, and select one of the plurality of conditions based on a value of a first programmable field of the plurality of programmable fields.

2. The circuit of claim 1, wherein the programmable interface signal includes at least one of:

a level change with no cycle delay;

an edge change with no cycle delay;

a level change with a cycle delay; or an edge change with a cycle delay.

3. The circuit of claim 1, wherein the plurality of programmable fields comprise:

a second programmable field indicating whether to provide the programmable interface signal associated with a new address;

a third programmable field indicating a maximum number of inputs in the instruction signal; and a fourth programmable field indicating a number of outputs in the instruction signal.

4. The circuit of claim 3, wherein the memory controller further comprises at least one logic gate of:

an inverse gate;

an AND gate;

an OR gate; or an XOR gate.

5. The circuit of claim 4, wherein the memory controller is configured to provide the programmable interface signal based on a function of inputs in the instruction signal, the function generated based on the at least one logic gate.

6. The circuit of claim 1, wherein a type of the memory device is at least one of:

non-volatile memory, multi-time programmable memory (MTP), resistive random access memory (RRAM) or magneto-resistive random access memory (MRAM).

7. The circuit of claim 1, wherein the programmable memory array is one of static random access memory (SRAM), read-only memory (ROM), or flip flops.

8. A system, comprising:
a host configured to provide an instruction signal;
a memory controller, including a programmable memory array, the memory controller configured to receive the instruction signal and generate a programmable interface signal based on the instruction signal; and
a memory device configured to be configured based on the programmable interface signal,
wherein the programmable memory array stores a plurality of programmable fields, and
wherein the memory controller comprises a multiplexer configured to receive the instruction signal that includes a plurality of conditions, and select one of the plurality of conditions based on a value of a first programmable field of the plurality of programmable fields.

9. The system of claim 8, wherein the programmable interface signal includes at least one of:
a level change with no cycle delay;
an edge change with no cycle delay;
a level change with a cycle delay; or
an edge change with a cycle delay.

10. The system of claim 8, wherein the plurality of programmable fields comprise:
a second programmable field indicating whether to provide the programmable interface signal associated with a new address;
a third programmable field indicating a maximum number of inputs in the instruction signal; and
a fourth programmable field indicating a number of outputs in the instruction signal.

11. The system of claim 8, wherein the memory controller further comprises at least one logic gate of:
an inverse gate;
an AND gate;
an OR gate; or
an XOR gate.

12. The system of claim 8, wherein the memory controller is configured to provide the programmable interface signal based on a function of inputs in the instruction signal, the function generated based on the at least one logic gate.

13. The system of claim 8, wherein a type of the memory device is at least one of:
non-volatile memory, multi-time programmable memory (MTP), resistive random access memory (RRAM) or magneto-resistive random access memory (MRAM).

14. The system of claim 8, wherein the programmable memory array is one of static random access memory (SRAM), read-only memory (ROM), or flip flops.

15. A method, comprising:
providing, by a host, an instruction signal;
receiving, by a memory controller including a programmable memory array, the instruction signal, wherein the programmable memory array stores a plurality of programmable fields;
receiving, by a multiplexer of the memory controller, the instruction signal that includes a plurality of conditions;
selecting, by the multiplexer, one of the plurality of conditions based on a value of a first programmable field of the plurality of programmable fields;
generating, by the memory controller, a programmable interface signal based on the instruction signal; and
configuring a memory device based on the programmable interface signal.

16. The method of claim 15, wherein the programmable interface signal includes at least one of:
a level change with no cycle delay;
an edge change with no cycle delay;
a level change with a cycle delay; or
an edge change with a cycle delay.

17. The method of claim 15, further comprising:
providing, by the memory controller, the programmable interface signal based on a function of inputs in the instruction signal, the function generated based on at least one logic gate of an inverse gate, an AND gate, an OR gate, or an XOR gate.

18. The circuit of claim 1, wherein the plurality of conditions comprise a plurality of signals or values that indicate a command status associated with a read, program, or erase operation of the memory device.

19. The system of claim 8, wherein the plurality of conditions comprise a plurality of signals or values that indicate a command status associated with a read, program, or erase operation of the memory device.

20. The method of claim 15, wherein the plurality of conditions comprise a plurality of signals or values that indicate a command status associated with a read, program, or erase operation of the memory device.

* * * * *